(12) United States Patent
Chai et al.

(10) Patent No.: US 9,031,595 B2
(45) Date of Patent: May 12, 2015

(54) METHOD AND APPARATUS FOR MEASURING CARRIER IN DEACTIVATED STATE

(71) Applicant: Huawei Technologies Co., Ltd., Shenzhen, Guangdong (CN)

(72) Inventors: Li Chai, Shenzhen (CN); Yuhua Chen, Shenzhen (CN); Miao Zhang, Shenzhen (CN); Weiwei Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 380 days.

(21) Appl. No.: 13/664,174

(22) Filed: Oct. 30, 2012

(65) Prior Publication Data

US 2013/0053082 A1    Feb. 28, 2013

Related U.S. Application Data

(63) Continuation of application No. PCT/CN2011/073593, filed on May 3, 2011.

(30) Foreign Application Priority Data

Apr. 30, 2010   (CN) .......................... 2010 1 0169441

(51) Int. Cl.
*H04B 7/00*   (2006.01)
*H04W 52/28*   (2009.01)
(Continued)

(52) U.S. Cl.
CPC ........ *H04W 52/287* (2013.01); *H04W 52/0222* (2013.01); *H04W 52/0219* (2013.01); *H04W 52/0229* (2013.01); *H04W 52/028* (2013.01); *H04B 17/0045* (2013.01); *Y02B 60/50* (2013.01)

(58) Field of Classification Search
USPC ........ 455/422.1, 450–452.1, 456.2, 464, 509, 455/510, 67.11
See application file for complete search history.

(56) References Cited

U.S. PATENT DOCUMENTS 7,693,054 B2 * 4/2010 Liu ............................... 370/230
2002/0190725 A1 * 12/2002 Craven .......................... 324/627
(Continued)

FOREIGN PATENT DOCUMENTS

CN      1725869 A      1/2006
CN    101189903 A      5/2008
(Continued)

OTHER PUBLICATIONS

Search Report in corresponding Chinese Patent Application No. 2010101694416 (May 13, 2013).
(Continued)

*Primary Examiner* — Dominic E Rego
(74) *Attorney, Agent, or Firm* — Leydig, Voit & Mayer, Ltd.

(57) ABSTRACT

A method for measuring a carrier in a deactivated state. The method includes receiving a configuration mode that does not take effect immediately by a user terminal (UE). If a deactivation control signal for a carrier is received by the UE or if a carrier timer of the UE expires, then the method includes switching the carrier from an activated state to a deactivated state, and measuring the carrier in deactivated state by the UE. Alternatively, if an activation control signal for a carrier in the deactivated state that is being measured is received by the UE, the method includes terminating measurement of the carrier in the deactivated state by the UE. Through controllable deactivated carrier measurement, the UE reduces battery power consumption and improves system performance. Embodiments also include an apparatus for measuring a carrier in deactivated state, a base station, and computer-readable storage medium for performing the method.

18 Claims, 24 Drawing Sheets

---

101. receives a configuration mode that does not take effect immediately;

102a. if a deactivation control signaling for a carrier is received by the UE or if a carrier timer of the UE expires, the carrier is switched from activated state to deactivated state, and the UE measures the carrier in deactivated state;

102b. if an activation control signaling for a carrier in deactivated state that is being measured is received by the UE, it terminates measurement of the carrier in deactivated state.

(51) Int. Cl.
*H04W 52/02* (2009.01)
*H04B 17/00* (2006.01)

(56) References Cited

U.S. PATENT DOCUMENTS

| | | | |
|---|---|---|---|
| 2003/0224772 A1 | 12/2003 | Patzer et al. | |
| 2006/0223533 A1 | 10/2006 | Sakata | |
| 2006/0281465 A1 | 12/2006 | McBeath et al. | |
| 2011/0007681 A1* | 1/2011 | Park et al. | 370/311 |
| 2011/0053658 A1* | 3/2011 | Park et al. | 455/574 |

FOREIGN PATENT DOCUMENTS

| | | |
|---|---|---|
| CN | 101635939 A | 1/2010 |
| CN | 101841823 A | 9/2010 |
| WO | WO 2011/041662 A1 | 4/2011 |

OTHER PUBLICATIONS

Extended European Search Report in corresponding European Patent Application No. 11774428.4 (May 17, 2013).

"R2-100280—Analysis on Carrier Activation and De-activation", 3GPP TSG-RAN WG2 Meeting #68bis, Jan. 18-22, 2010, 3GPP, Valbonne, France.

"R2-101021—Measurements on Deactivated CC", 3GPP TSG RAN WG2 Meeting #69, Feb. 22-26, 2010, 3GPP, Valbonne, France.

"R2-101076—Explicit Activation and Deactivation", 3GPP TSG RAN WG2 Meeting #69, Feb. 22-26, 2010, 3GPP, Valbonne, France.

"R2-101150—Discussion on CC Activation and Deactivation", 3GPP TSG RAN WG2 Meeting #69, Feb. 22-26, 2010, 3GPP, Valbonne, France.

"R2-101492—CC Activation/Deactivation Details", 3GPP TSG RAN WG2 Meeting #69, Feb. 22-26, 2010, 3GPP, Valbonne, France.

"R4-101375—Further Discussion on Measurement in CA", 3GPP TSG-RAN WG4 Meeting Ad Hoc 2010 #02, Apr. 12-16, 2010, 3GPP, Valbonne, France.

International Search Report in corresponding International Patent Application No. PCT/CN2011/073593 (Aug. 11, 2011).

Written Opinion of the International Searching Authority in corresponding International Patent Application No. PCT/CN2011/073593 (Aug. 11, 2011).

* cited by examiner

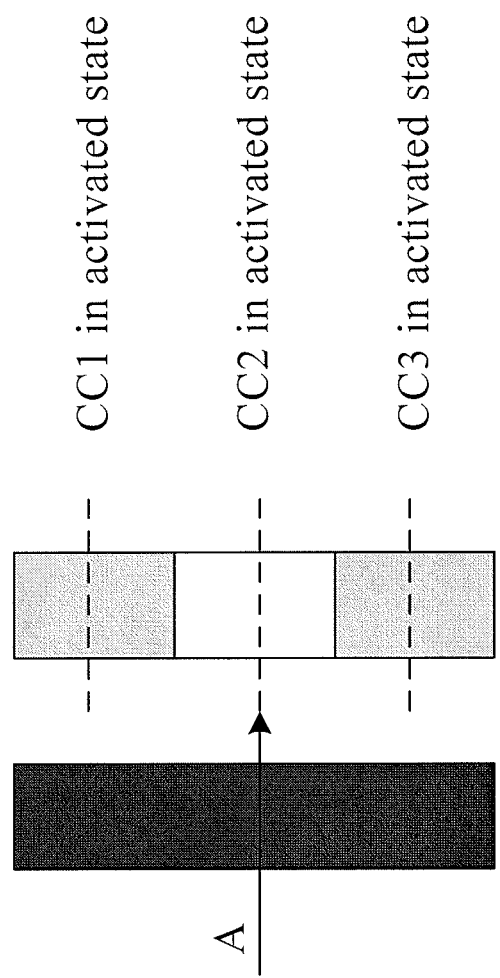
Fig. 4a1

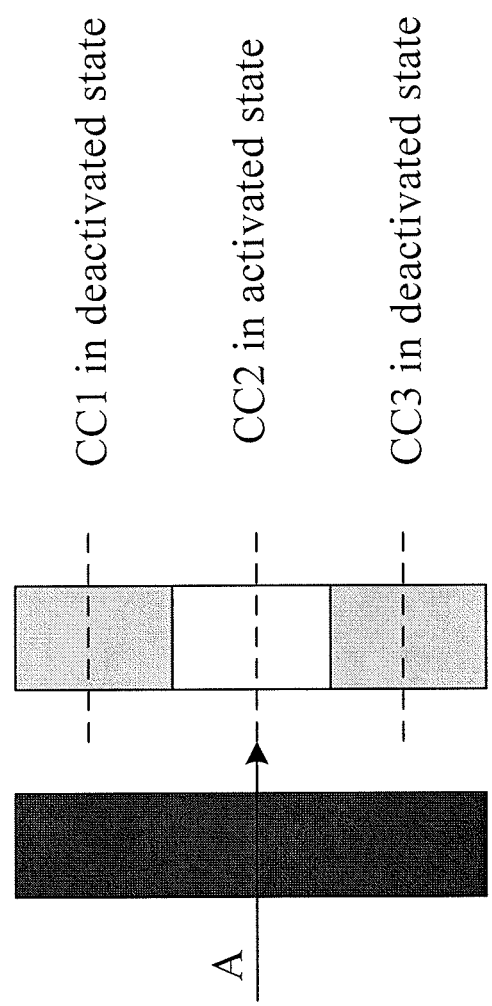

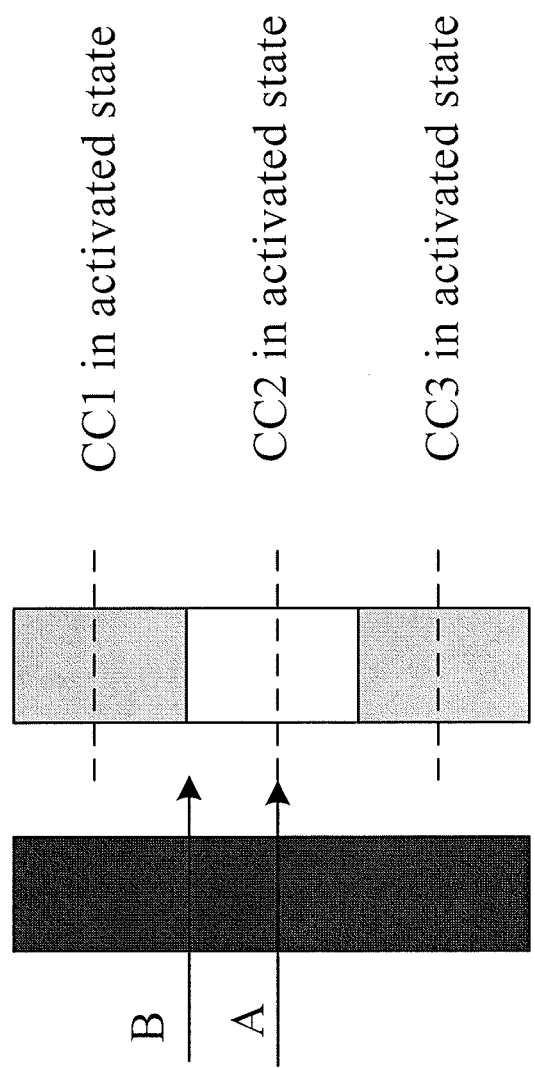
Fig. 4a3

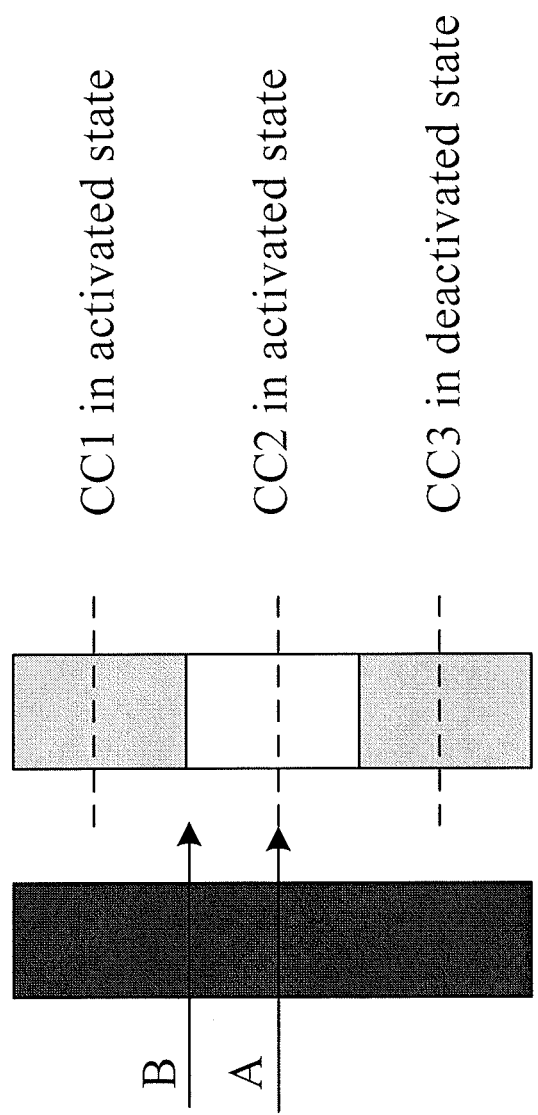
Fig. 4a4

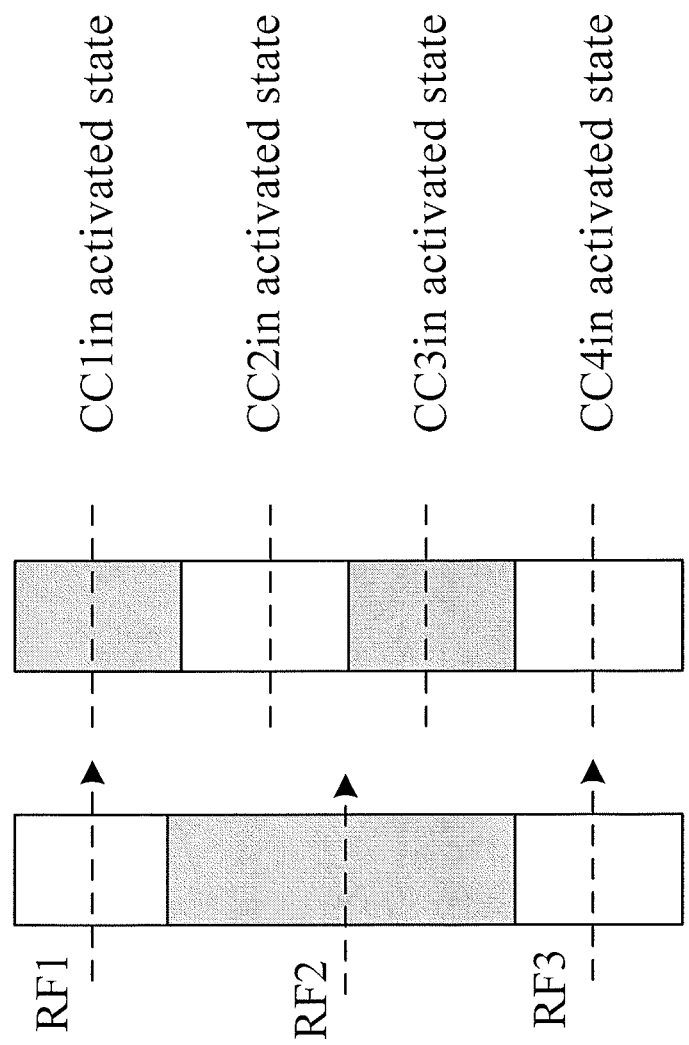
Fig. 4a5

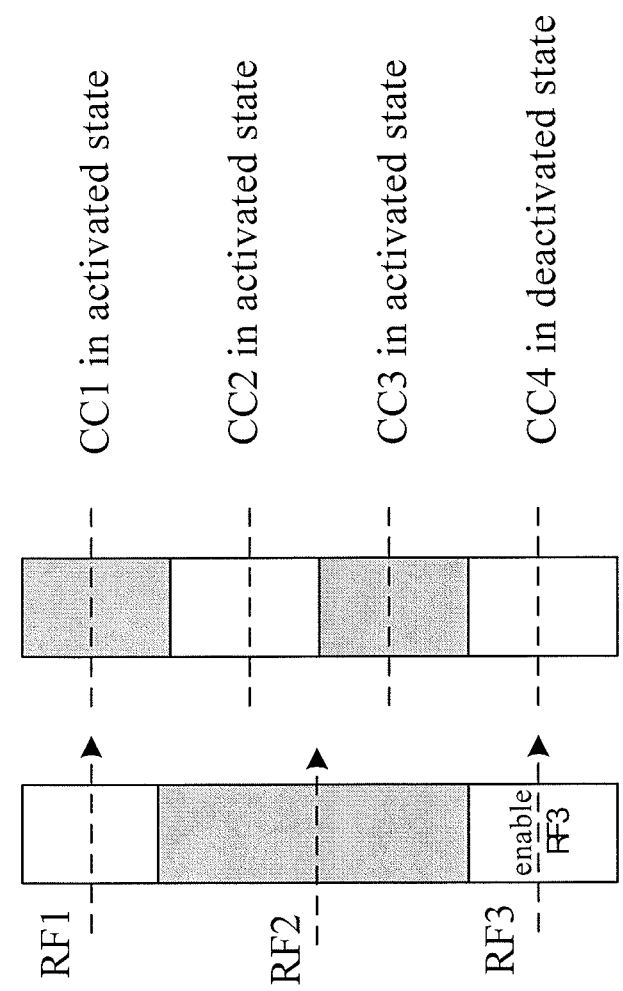
Fig. 4a6

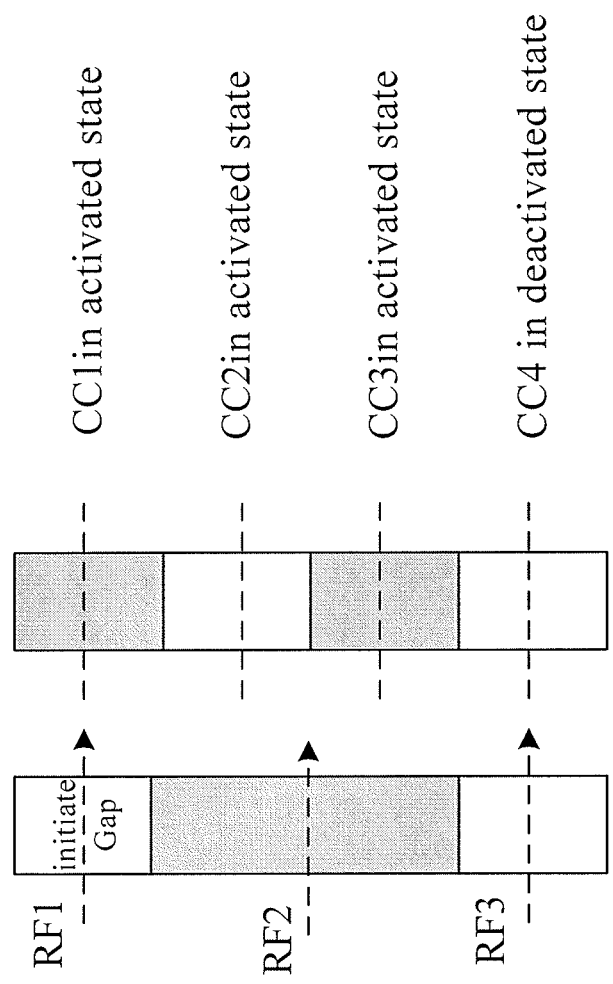
Fig. 4a7

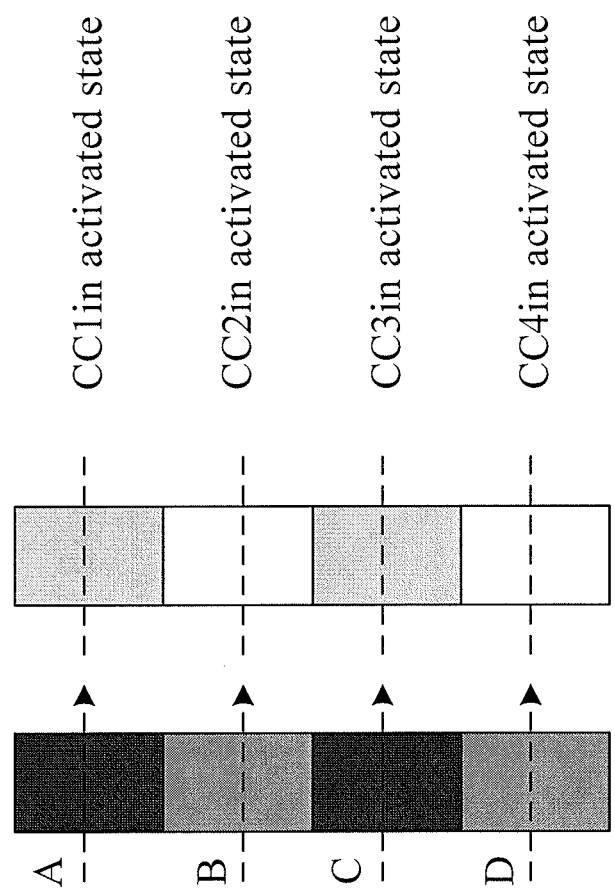
Fig. 5a1

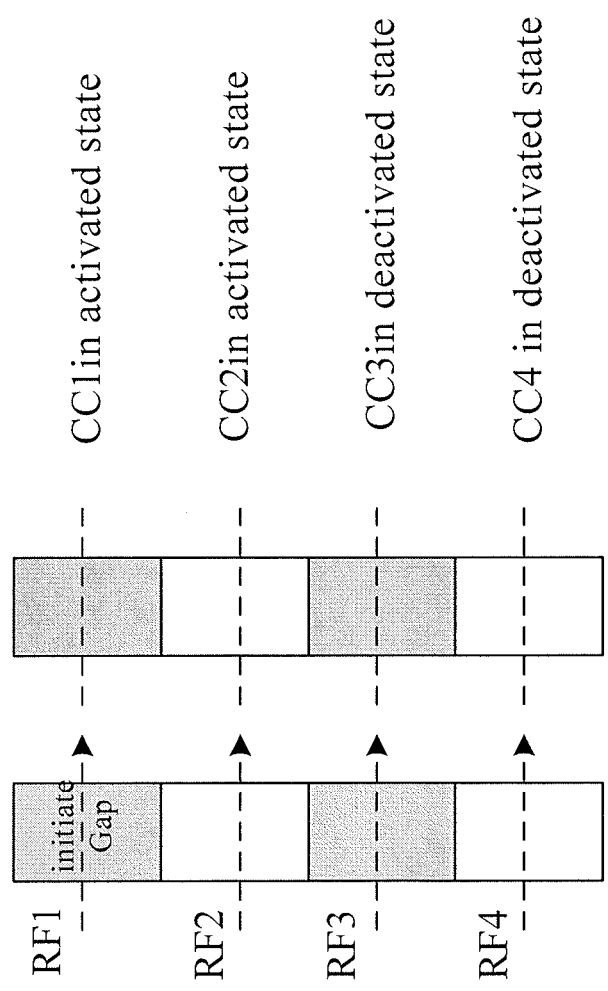
Fig. 5a2

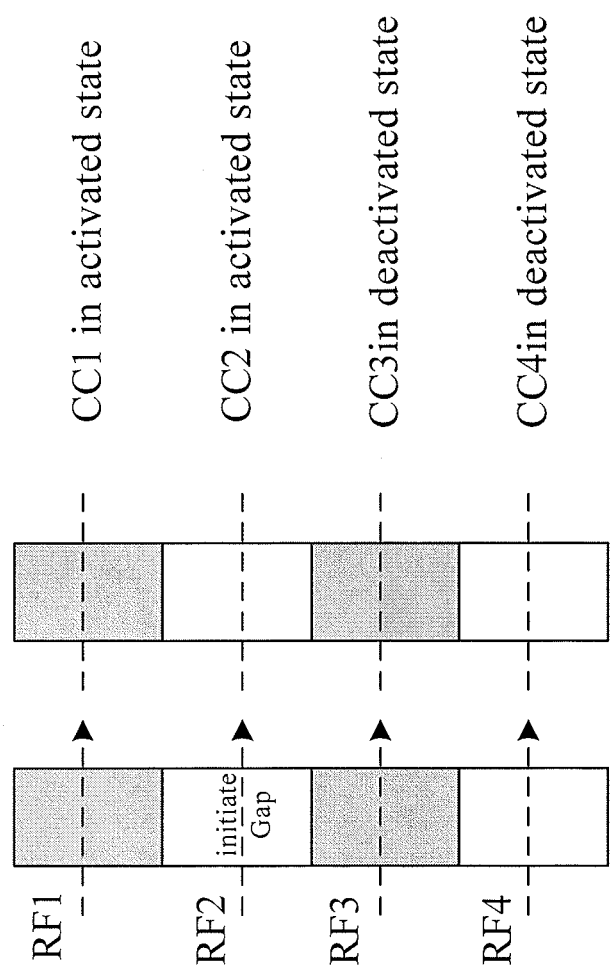
Fig. 5a3

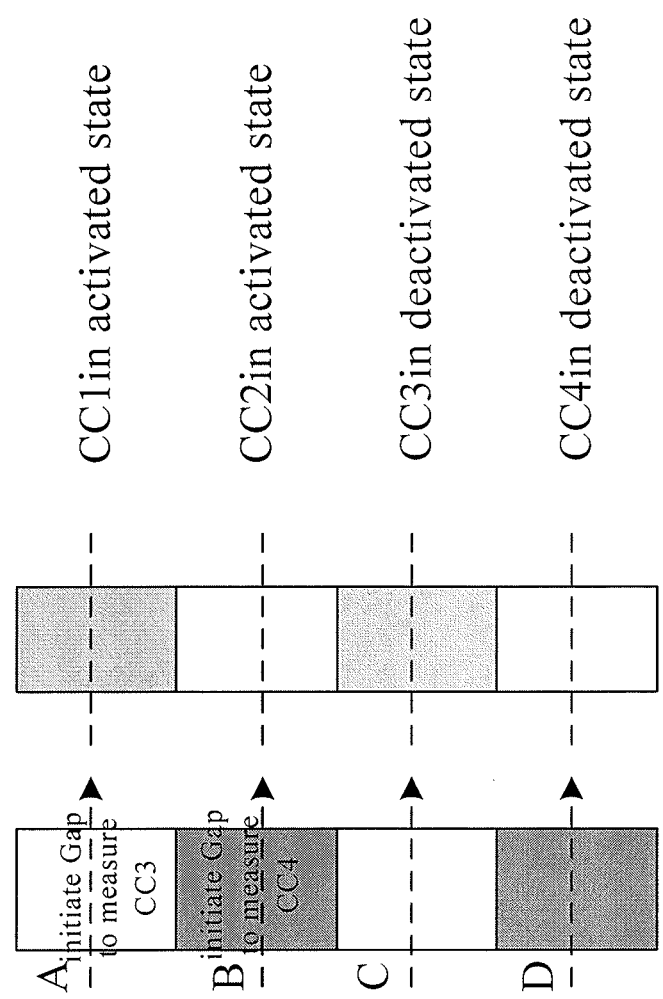
Fig. 5a4

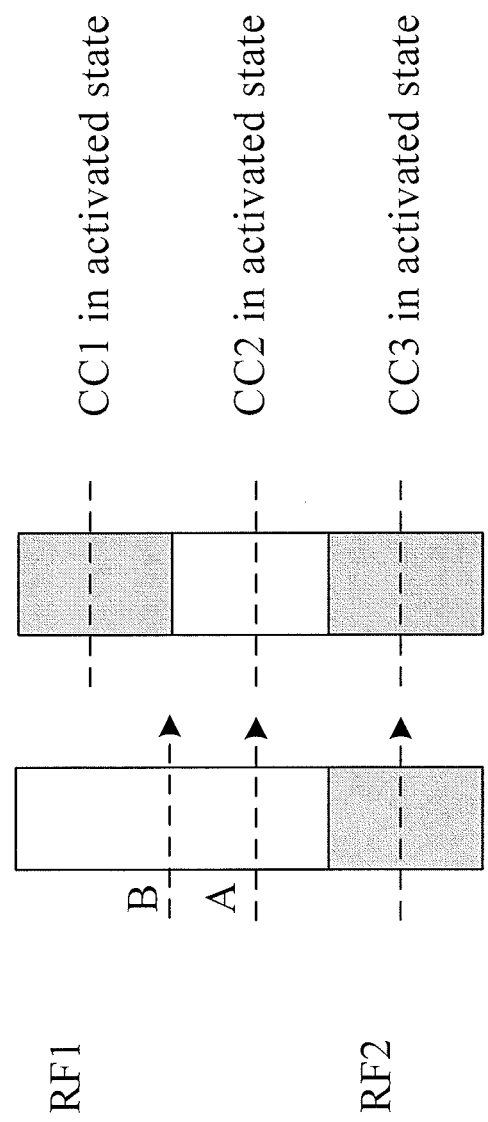
Fig. 5a5

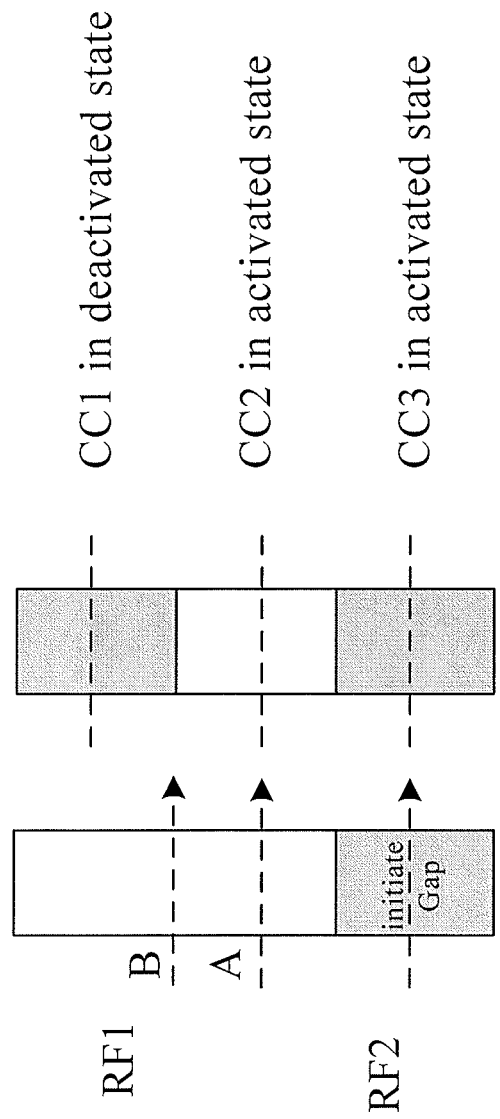
Fig. 5a6

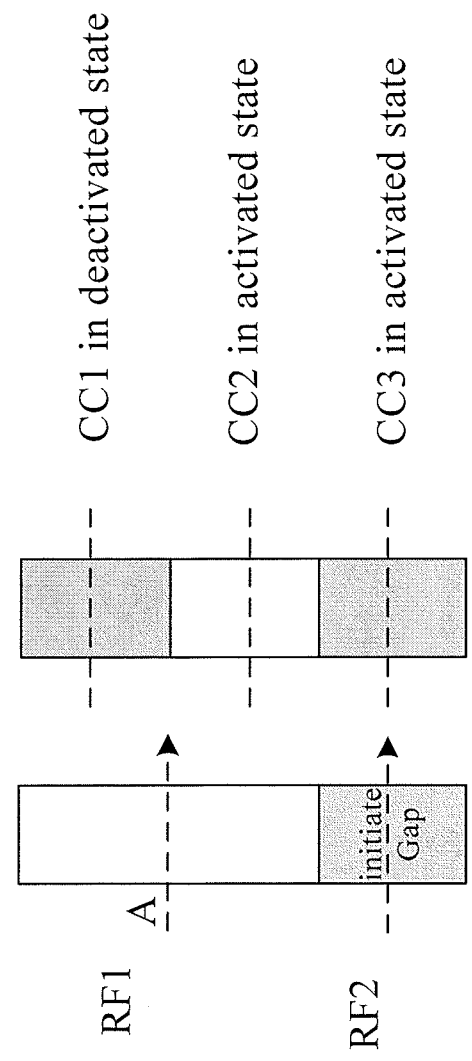
Fig. 5a7

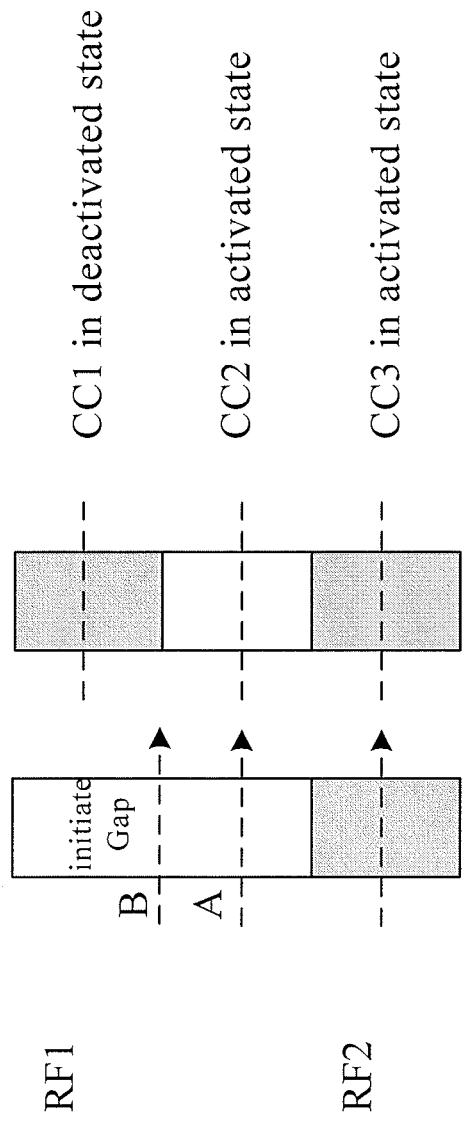
Fig. 5a8

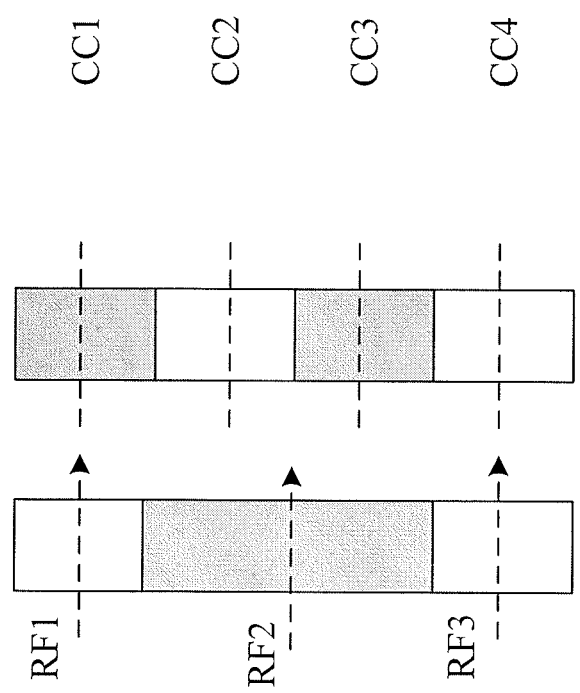

METHOD AND APPARATUS FOR MEASURING CARRIER IN DEACTIVATED STATE

CROSS-REFERENCE TO RELATED APPLICATIONS

This application is a continuation of International Application No. PCT/CN2011/073593, filed on May 3, 2011, which claims priority to Chinese Patent Application No. 201010169441.6, filed on Apr. 30, 2010, both of which are hereby incorporated by reference in their entireties.

TECHNICAL FIELD

Some embodiments of the invention relate to the field of wireless communication technology, and more specifically, to a method and apparatus for measuring a carrier in deactivated state.

DESCRIPTION OF THE RELATED ART

In the carrier aggregation technique of Long Term Evolution Advance (LTE-Advance), carrier activation and deactivation mechanisms are widely applied to packet service, File Transfer Protocol (FTP), and the like, where data packets of those services arrive in bursts and a size of those data packets is large. Thus, when UE (User Equipment) sends and/or receives data to and/or from a BS (Base Station) through an activated carrier, the UE has to monitor Physical Downlink Control Channel (PDCCH) for all carriers kept in an activated state. However, continuously monitoring all activated carriers leads to high battery power consumption of the UE. In order to reduce UE battery power consumption, the UE can activate carriers required to transmit data only upon the arrival of data packets, and only use a few carriers to keep activated when no data arrives or only a small amount of data arrives.

In order to guarantee a success ratio for activating carriers required for data transmission and to avoid data loss and interruption, it is necessary for the BS to measure and acquire signal quality and interference level of carriers in a deactivated state before activating those deactivated carriers. However, highly frequent and highly precise measurement may consume battery power of terminals, which degrades system performance.

SUMMARY OF THE INVENTION

One embodiment provides a method for measuring a carrier in deactivated state which is capable of improving system performance.

On one aspect, a method for measuring a carrier in deactivated state is provided, comprising:

receiving a request to enter configuration mode that does not take effect immediately by a user terminal UE;

if a deactivation control signaling for a carrier is received by the UE or if a carrier timer of said UE expires, then switching the carrier from an activated state to a deactivated state, and measuring the carrier in the deactivated state by the UE; or if an activation control signaling for a carrier in deactivated state that is being measured is received by the UE, then terminating measurement of the carrier in deactivated state by the UE.

In another aspect, another method for measuring a carrier in deactivated state is provided, comprising:

sending a request to enter a configuration mode that does not take effect immediately by a base station, to place the UE in the configuration mode that does not take effect immediately;

sending an activation control signal for a carrier from the base station to a UE, to cause a carrier to switch from an activated state to a deactivated state when the UE receiving deactivation control signal for the carrier, and measuring the carrier in deactivated state by said UE; or sending an activation control signal for a carrier in a deactivated state that is being measured from the base station to the UE, to cause the UE to terminate measurement of the carrier in the deactivated state.

In another aspect, an apparatus for measuring a carrier in deactivated state is provided, comprising:

a first receiving module, configured to receive a request to enter a configuration mode that does not take effect immediately;

a second receiving module, configured to, when in the configuration mode that does not take effect immediately, receive a deactivation control signal for a carrier or a timeout notification of a carrier timer, or when in the configuration mode that does not take effect immediately, receive an activation control signal for a carrier in deactivated state that is being measured; and a process module, configured to, when a deactivation control signal or a timeout notification is received by the second receiving module, switch the carrier from an activated state to a deactivated state, and measure the carrier in the deactivated state; or when an activation control signaling for a carrier in a deactivated state is received by the second receiving module, terminate measurement of the carrier in the deactivated state.

In another aspect, a base station is provided, comprising:

a first sending module transmitter, configured to send a request to enter a configuration mode that does not take effect immediately to a UE to cause the UE to enter the configuration mode that does not take effect immediately;

a second transmitter, configured to send a deactivation control signal for a carrier to UE to cause a carrier to switch from an activated state to a deactivated state when the UE receiving the deactivation control signal for the carrier, and measure the carrier in the deactivated state; or for sending to the UE an activation control signal for a carrier in the deactivated state that is being measured, to cause the UE to terminate measurement of the carrier in the deactivated state.

In embodiments of the invention, a user terminal UE receives a configuration mode that does not take effect immediately; if a deactivation control signaling for a carrier is received by the UE or if a carrier timer of the UE expires, the carrier is switched from activated state to deactivated state, and the UE measures the carrier in deactivated state; or if an activation control signaling for a carrier in deactivated state that is being measured is received by the UE, then the UE terminates measurement of the carrier in deactivated state. Through enhancing controllability of deactivated carrier measurement, the UE can reduce terminal battery power consumption and improve system performance.

BRIEF DESCRIPTION OF THE DRAWINGS

For a more explicit description of the technical solutions of embodiments of the invention, a brief introduction of accompanying drawings to be used in the description of these embodiments will be given below. Obviously, accompanying drawings described below are merely some embodiments of the invention, for those skilled in the art, other accompanying drawings can be derived from these ones without any creative efforts.

FIG. 4a1 is a schematic diagram of a carrier configuration of an embodiment of the invention;

FIG. 4a2 is a schematic diagram of measuring a carrier in deactivated state of an embodiment of the invention;

FIG. 4a3 is a schematic diagram of another carrier configuration of an embodiment of the invention;

FIG. 4a4 is another schematic diagram of measuring a carrier in deactivated state of an embodiment of the invention;

FIG. 4a5 is a schematic diagram of another carrier configuration of an embodiment of the invention;

FIG. 4a6 is another schematic diagram of measuring a carrier in deactivated state of an embodiment of the invention;

FIG. 4a7 is another schematic diagram of measuring a carrier in deactivated state of an embodiment of the invention;

FIG. 5 is a schematic diagram of a flow of a method for measuring a carrier in deactivated state according to another embodiment of the invention;

FIG. 5a1 is a schematic diagram of a carrier configuration of an embodiment of the invention;

FIG. 5a2 is another schematic diagram of measuring a carrier in deactivated state of an embodiment of the invention;

FIG. 5a3 is another schematic diagram of measuring a carrier in deactivated state of an embodiment of the invention;

FIG. 5a4 is another schematic diagram of measuring a carrier in deactivated state of an embodiment of the invention;

FIG. 5a5 is a schematic diagram of a carrier configuration of an embodiment of the invention;

FIG. 5a6 is another schematic diagram of measuring a carrier in deactivated state of an embodiment of the invention;

FIG. 5a7 is another schematic diagram of measuring a carrier in deactivated state of an embodiment of the invention;

FIG. 5a8 is another schematic diagram of measuring a carrier in deactivated state of an embodiment of the invention;

FIG. 6 is a schematic diagram of a flow of a method for measuring a carrier in deactivated state according to another embodiment of the invention;

FIG. 6a is a schematic diagram of a flow of a method for measuring a carrier in deactivated state according to another embodiment of the invention;

FIG. 7 is a schematic diagram of a flow of a method for measuring a carrier in deactivated state according to another embodiment of the invention;

FIG. 8 is a schematic structure diagram of an apparatus for measuring a carrier in deactivated state of the invention;

DETAILED DESCRIPTION OF THE PREFERRED EMBODIMENT

For making objects, technical solutions, and advantages of embodiments of the invention more clear, description will be given below regarding embodiments of the invention in connection with accompanying drawings. Obviously, embodiments described herein are merely some embodiments of the invention, but not all of them. Based on those embodiments of the invention, other embodiments can occur to those skilled in the art without any creative efforts, all of which fall within the scope of the invention.

Figure 1:
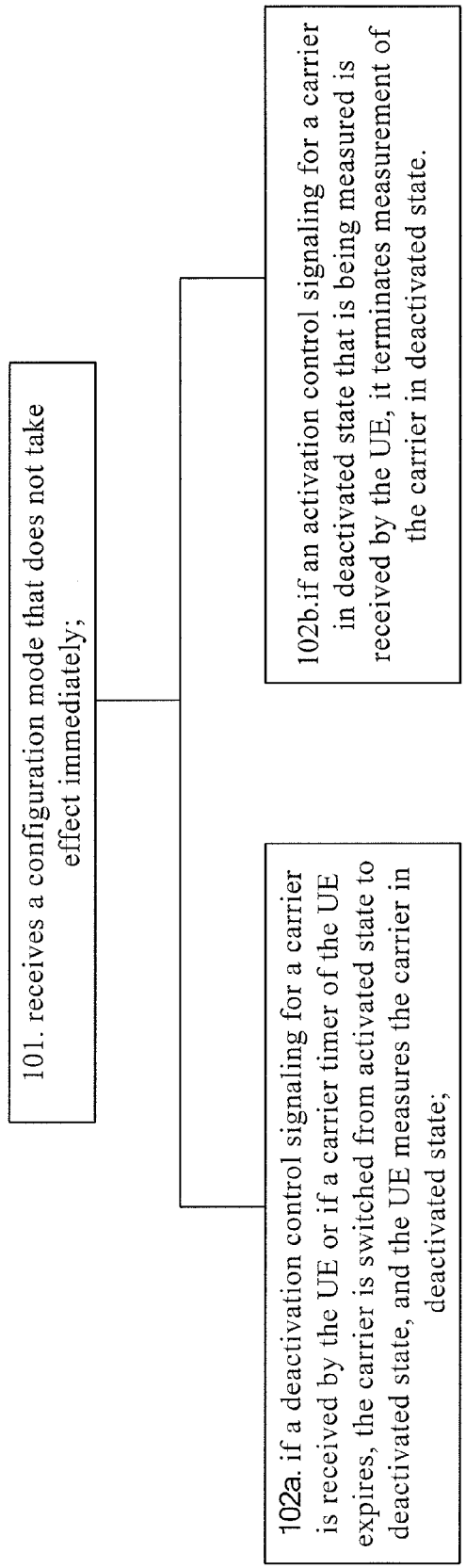
FIG. 1 is a schematic diagram of a flow of a method for measuring a carrier in deactivated state according to an embodiment of the invention.

FIG. 1 is a schematic diagram of a flow of a method for measuring a carrier in deactivated state according to an embodiment of the invention, comprising the following steps:

Step 101. A user terminal UE receives a configuration mode that does not take effect immediately;

Step 102a. If a deactivation control signaling for a carrier is received by the UE or if a carrier timer of the UE expires, then the carrier is switched from an activated state to a deactivated state, and the UE measures the carrier in the deactivated state; or Step 102b. If an activation control signaling for a carrier in a deactivated state that is being measured is received by the UE, then the UE terminates the measurement of the carrier in deactivated state.

In the embodiment of the invention, a user terminal UE receives a configuration mode that does not take effect immediately; if a deactivation control signaling for a carrier is received by the UE or if a carrier timer of the UE expires, then the carrier is switched from activated state to deactivated state, and the UE measures the carrier in deactivated state; or if an activation control signaling for a carrier in deactivated state that is being measured is received by the UE, then the UE terminates measurement of the carrier in deactivated state. Through controllable deactivated carrier measurement, the UE can reduce its terminal battery power consumption and improve system performance.

Figure 2:
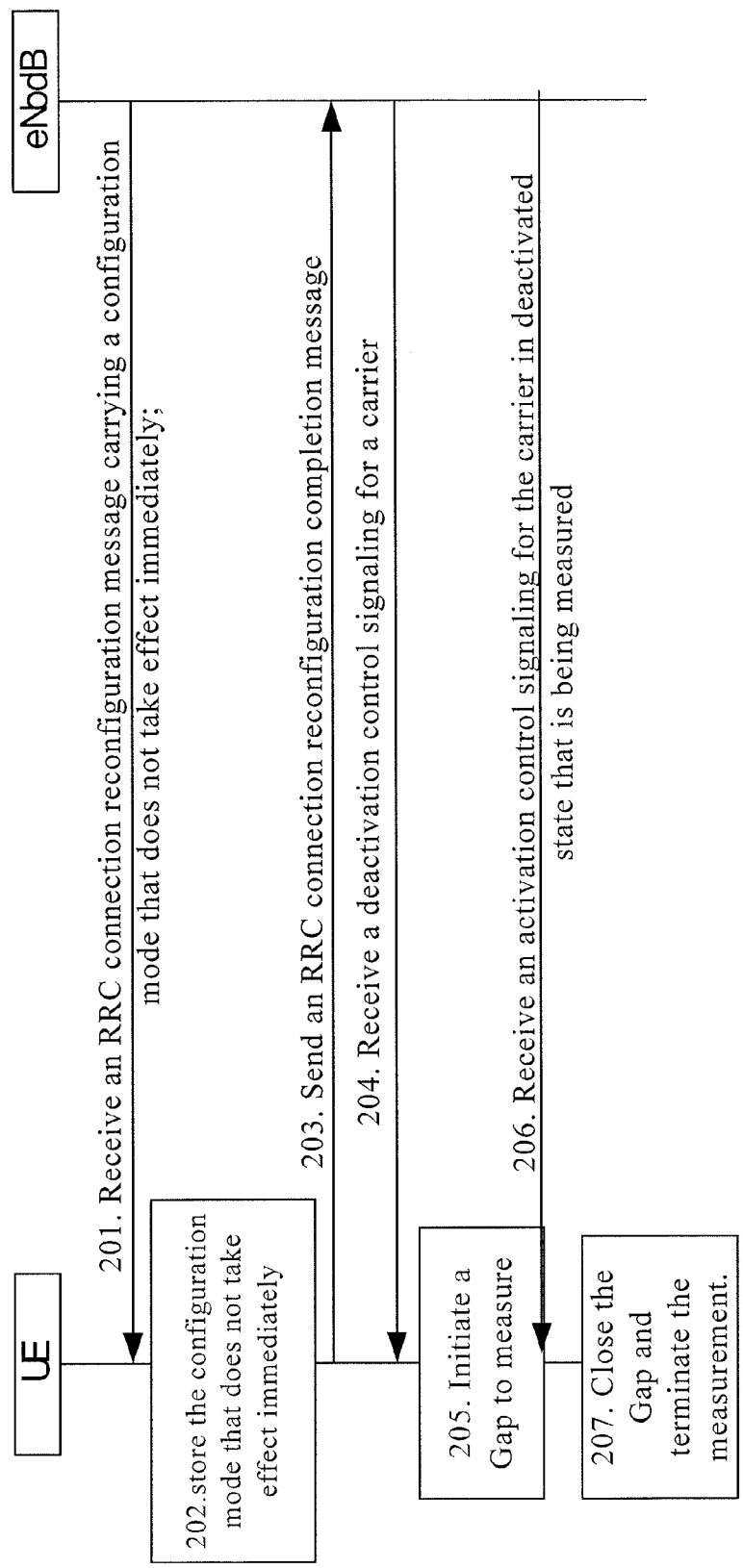
FIG. 2 is a schematic diagram of a flow of a method for measuring a carrier in deactivated state according to another embodiment of the invention.

FIG. 2 is a schematic diagram of a flow of an embodiment of method for measuring a carrier in deactivated state of the invention, in which a carrier is measured when it is in a deactivated state, comprising the following steps:

Step 201. The UE receives an Radio Resource Control (RRC) connection reconfiguration message sent from BS, wherein the configuration message carries a configuration mode that does not take effect immediately;

Step 202. The UE stores the configuration mode that does not take effect immediately;

Step 203. The UE sends to the BS an RRC connection reconfiguration completion message;

Step 204. The UE receives a deactivation control signaling for a carrier sent from the BS, and switches the carrier from activated state to deactivated state;

At step 204, the UE can confirm to switch the carrier to deactivated state from activated state by timeout of an internal carrier timer.

The control signaling can be Medium Access Control (MAC) signaling or a physical layer control signaling.

Step 205. The UE initiates a time slot Gap to measure the carrier in deactivated state;

Step 206. The UE receives an activation control signaling sent from the BS for the carrier in deactivated state that is being measured;

Step 207. The UE closes Gap and terminates measurement of the carrier in deactivated state.

After step 207, the UE initiates a gap again to perform deactivated carrier measurement only when a deactivation control signaling for the carrier in activated state is once again received by the UE from the BS.

In the embodiment of the invention, the UE receives a configuration mode that does not take effect immediately, switches a carrier to deactivated state from activated state, initiates a gap to measure the carrier in deactivated state; if an activation control signaling for the carrier in deactivated state that is being measured is received by the UE, then the UE terminates measurement of the carrier in deactivated state. Through controllable deactivated carrier measurement of the UE, terminal battery power consumption can be reduced and system performance can be improved.

Figure 3:
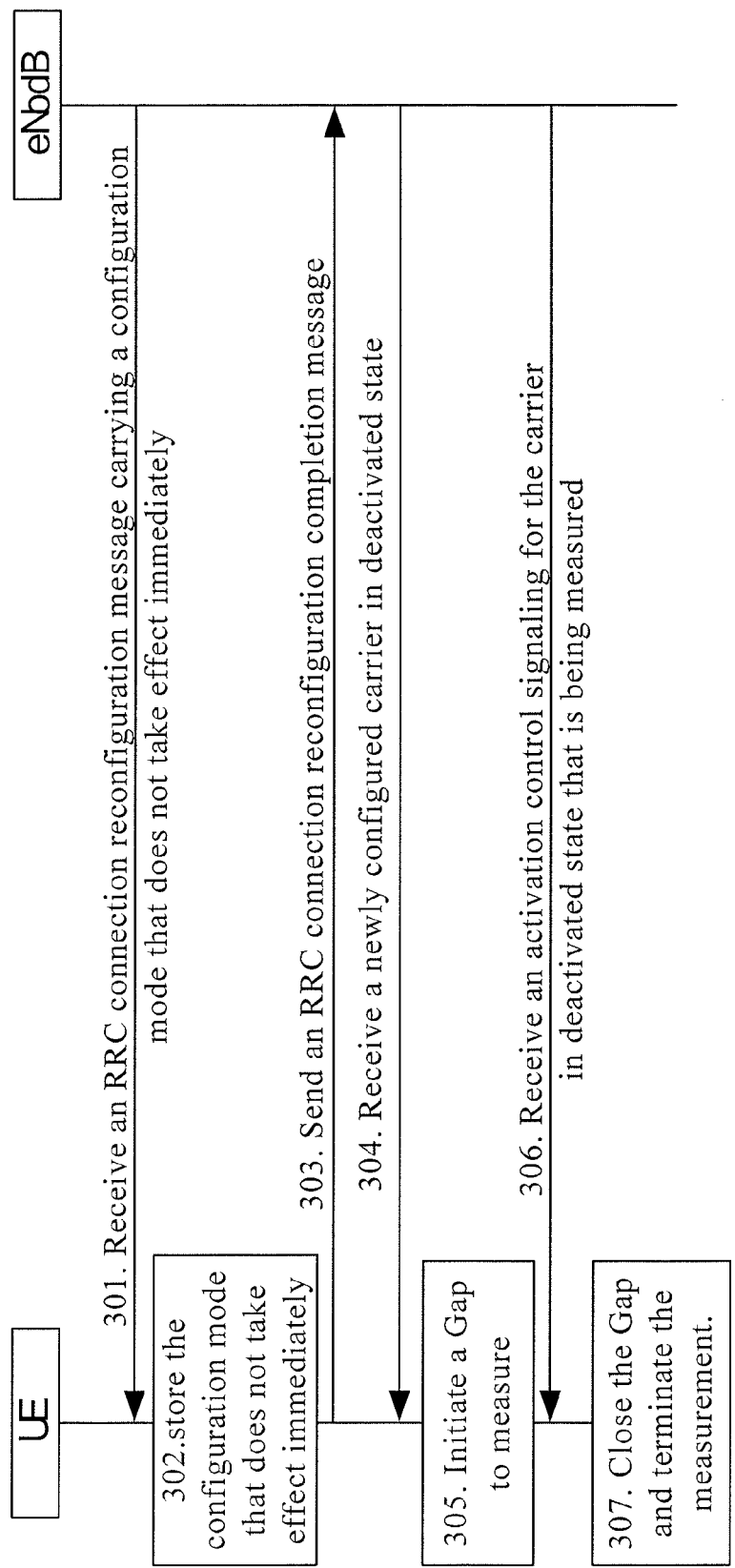
FIG. 3 is a schematic diagram of a flow of a method for measuring a carrier in deactivated state according to another embodiment of the invention.

FIG. 3 is a schematic diagram of a flow of a method for measuring a carrier in deactivated state according to another embodiment of the invention, which is similar to the embodiment shown in FIG. 2, except that the UE receives a newly configured carrier, which is a carrier newly configured by a BS for the UE. The newly configured carrier can be carrier in deactivated state or initial state, and then the UE initiates a gap to measure the carrier in deactivated state. In particular, the method of FIG. 3 comprises the following:

Step 301: The UE receives an RRC connection reconfiguration message carrying a configuration mode that does not take effect immediately.

Step 302: The UE stores the configuration mode that does not take effect immediately.

Step 303: The UE sends an RRC connection reconfiguration completion message.

Step 304: The UE receives a newly configured carrier in deactivated state.

Step 305: The UE initiates a Gap to measure.

Step 306: The UE receives an activation control signaling for the carrier in deactivated state that is being measured.

Step 307: The UE closes the Gap and terminates the measurement.

Figure 4:
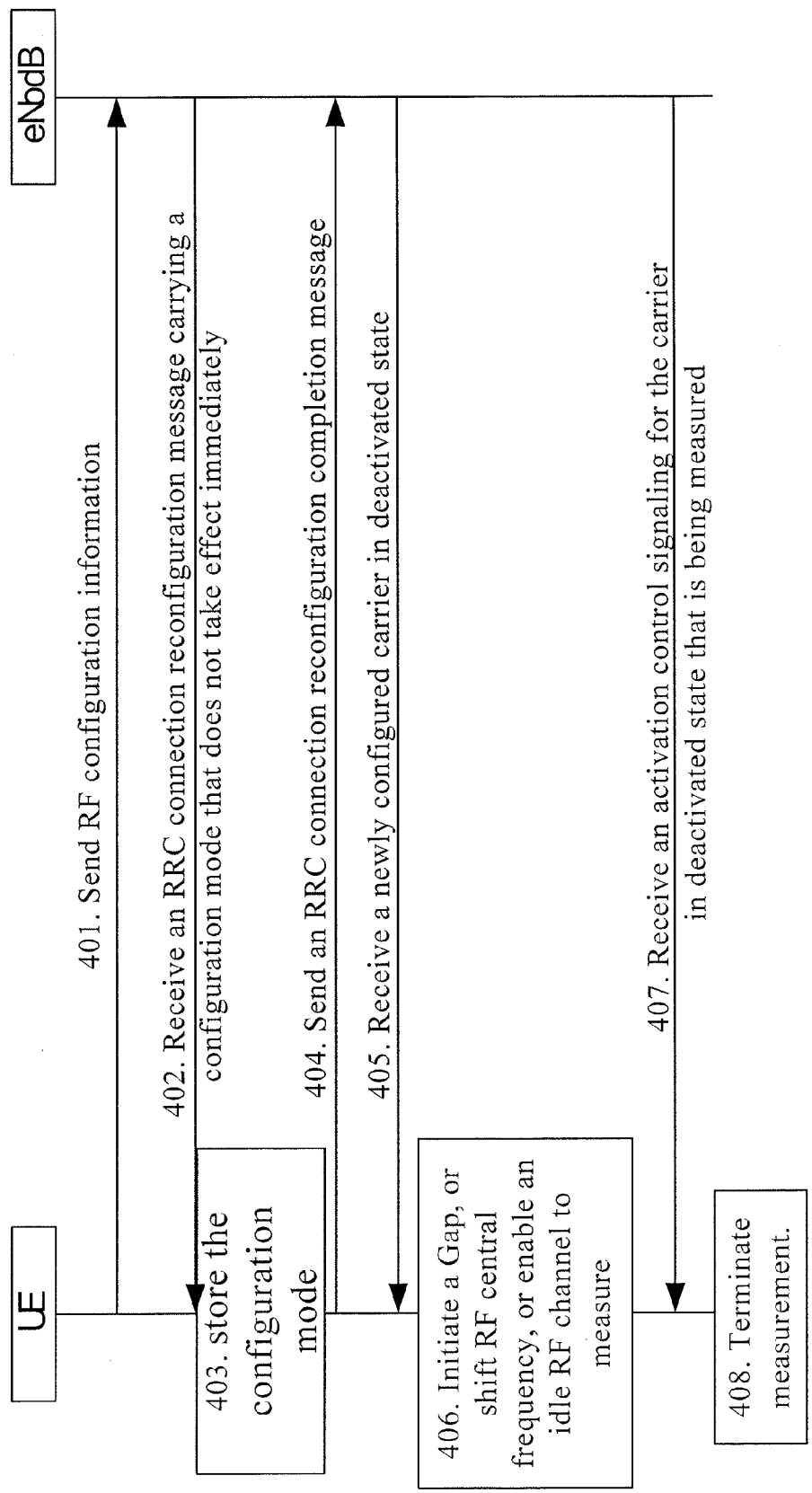
FIG. 4 is a schematic diagram of a flow of a method for measuring a carrier in deactivated state according to another embodiment of the invention.

FIG. 4 is a schematic diagram of a flow of a method for measuring a carrier in deactivated state according to another embodiment of the invention, in which if a carrier of the UE is in deactivated state, then the UE can measure the carrier in deactivated state through initiating a gap, shifting RF (radio frequency) central frequency, or enabling an idle RF channel. The embodiment comprises the following steps:

Step 401. The UE sends Radio Frequency (Radio Frequency, RF) capability information of the UE to a base station.

When the base station configures a new carrier for the UE, the UE sends RF capability in the band of the carrier only when there are at least two RF channels in the band.

In one embodiment, the UE sends its RF capability information in the same band to the base station.

For example, the capability information can be UE-EUTRA-Capability, where the RF capability information can comprise a maximum number of RF channels that can be supported in the band and receiving bandwidth supported by each RF, wherein the receiving bandwidth can be a maximum receiving bandwidth.

If the receiving bandwidth of the RFs in the same band is same, then the RF capability information in the same band can only comprise number of RFs supported in the band.

The RF capability information in the band can further comprise receiving bandwidth supported in the band, the receiving bandwidth is a bandwidth in which the UE can receive data and/or measure bandwidth simultaneously when all RF channels are enabled, the receiving bandwidth and/or measurement bandwidth can be a maximum bandwidth.

Step 402. The UE receives the RRC connection configuration message sent from the base station, where the configuration message carries a configuration mode that does not take effect immediately.

Step 403. The UE stores the configuration mode.

Step 404. An RRC connection reconfiguration completion message is sent to the base station.

Step 405. The UE receives a deactivation control signaling for a carrier sent from the base station, and switches the carrier from activated state to deactivated state.

The control signaling may be Medium Access Control (MAC) signaling or a physical layer control signaling.

Step 406. The UE measures the carrier in deactivated state through initiating a Gap, shifting RF central frequency, or enabling an idle RF channel.

The UE measuring the carrier in deactivated state through initiating a Gap, shifting the RF central frequency, or enabling an idle RF channel can be pre-configured. The pre-configuration can be configuration made by the base station based on the RF capability information reported by the UE, and then the BS can notify configuration information to the UE. The pre-configuration can comprise:

if each of configured carriers corresponds to an RF channel, then the UE receives a deactivated control signaling for a carrier, switches the carrier from activated state to deactivated state, initiates a gap on an enabled RF channel according to the RF capability of the UE to measure the carrier in deactivated state; or if each of configured carriers corresponds to a RF channel, then the UE receives a deactivated control signaling for a carrier, switches the carrier from activated state to deactivated state, enables a RF channel corresponding to the carrier in deactivated state according to the RF capability of the UE to perform measurement; or if at least two of configured carriers share a RF channel, then the UE receives a deactivated control signaling for a carrier, switches the carrier from activated state to deactivated state, shifts the central frequency of the RF channel according to the RF capability of the UE to measure the carrier in deactivated state; or if at least two of configured carriers share a RF channel, the UE receives a deactivated control signaling for a carrier, switches the carrier from activated state to deactivated state, and initiates a gap on an enabled RF channel according to the RF capability of the UE to measure the carrier in deactivated state.

An RF channel can cover multiple bands. When activated carriers and deactivated carriers are within the same band, particularly, when activated carriers and deactivated carriers are continuous carriers, the UE shifts an RF central frequency, that is, converts an RF channel corresponding to activated carriers to a broader bandwidth of the deactivated carriers such that the bandwidth can ensure data reception of activated carriers and measurement of deactivated carriers to be performed simultaneously.

For example, as shown in FIG. 4a1, carriers CC1, CC2, CC3 are carriers in an activated state, where the UE received a deactivation control signaling for CC1 and CC3. A is the RF central frequency. As shown in FIG. 4a2, the terminal can directly measure CC1 and CC3 without initiating a Gap.

As shown in FIG. 4a3, carriers CC1, CC2, CC3 are carriers in an activated state, where the UE received a deactivation control signaling for CC3. A is the RF central frequency. As shown in FIG. 4a4, the UE shifts the RF central frequency to B, initiates a gap to measure CC3; or shifts the central frequency back to A to measure CC3.

Figure 5:
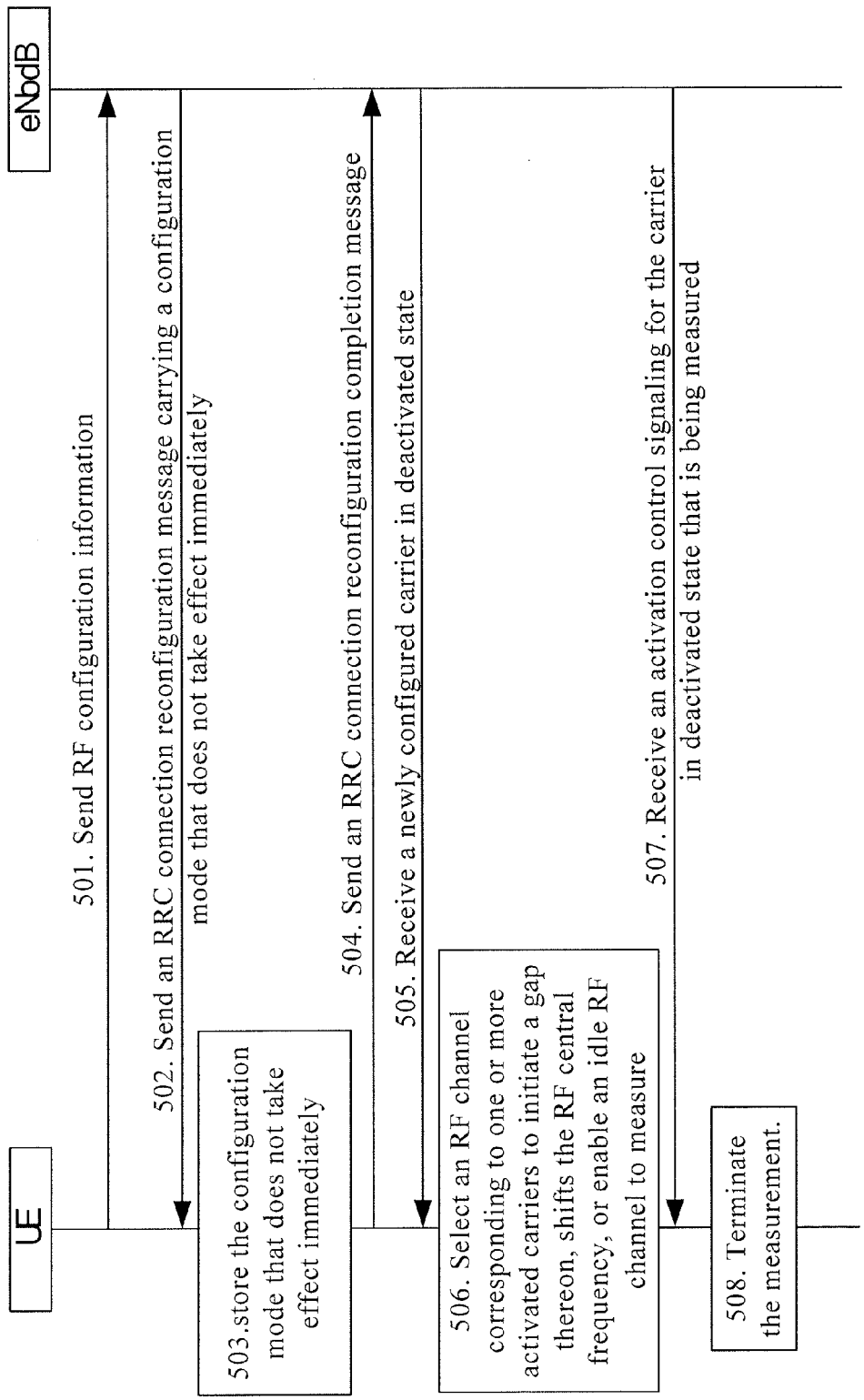
Figure 6:
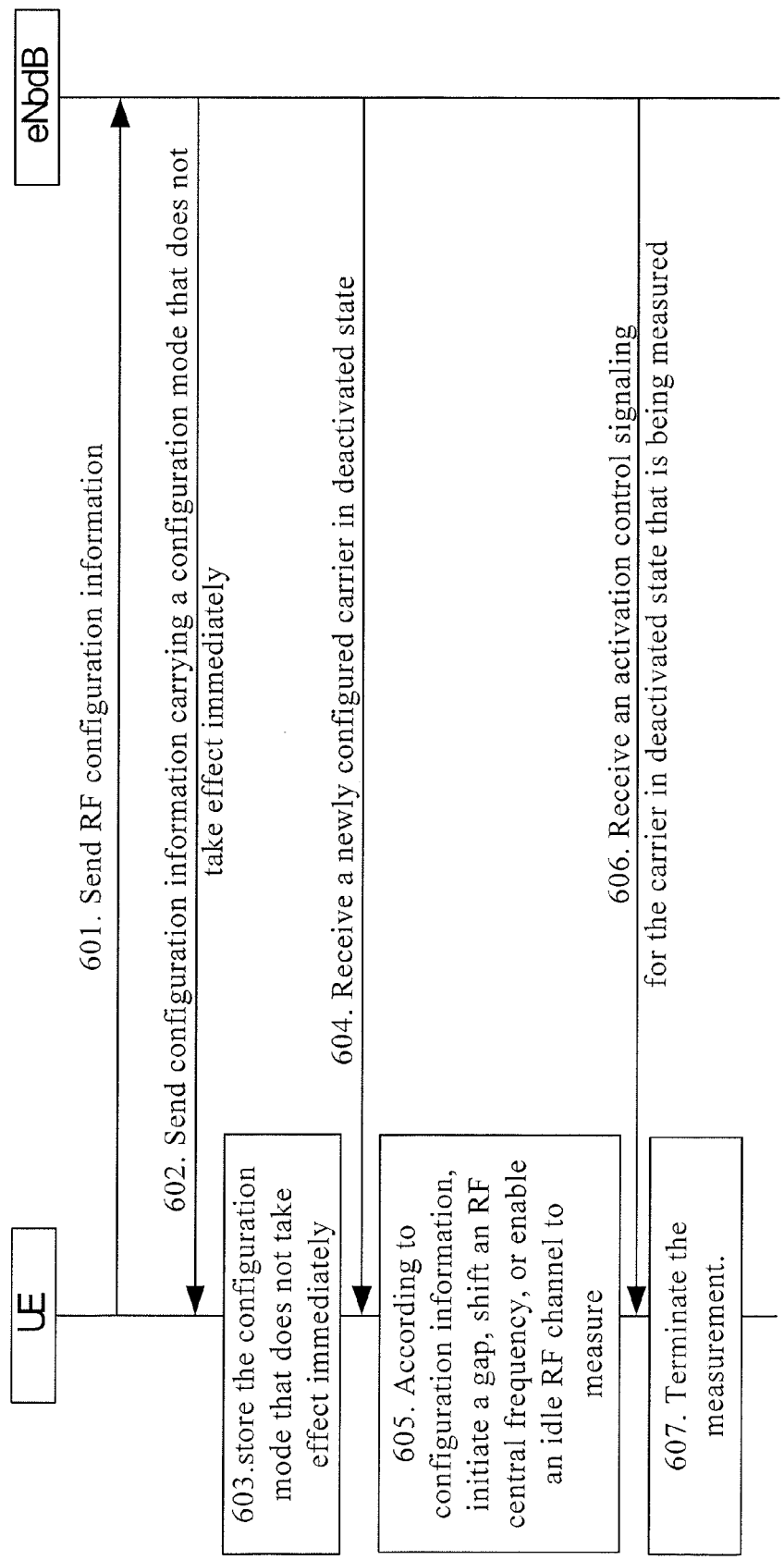
Figure 7:
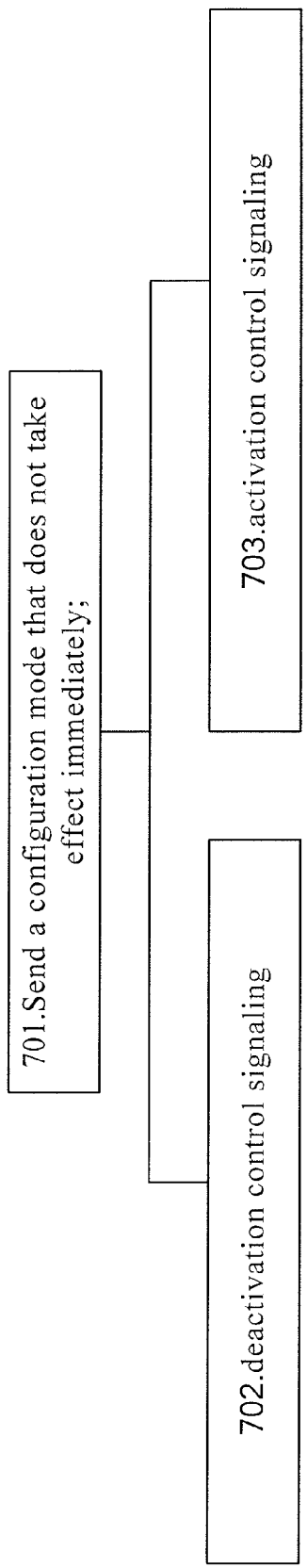

As shown in FIG. 4a5, carriers CC1, CC2, CC3, CC4 are carriers in an activated state, where the UE received a deactivation control signaling for CC4. As shown in FIG. 4a6, RF3 is enabled to measure CC4; or as shown in FIG. 4a7, a Gap is initiated on RF1 to measure CC4.

Step 407. The UE receives from the BS an activation control signaling for a carrier in deactivated state that is being measured.

Step 408. The UE terminates measurement of the carrier in deactivated state.

At step 406, if the UE has initiated a Gap to measure the carrier in deactivated state, then the Gap has to be closed at first to terminate the measurement of the carrier in deactivated state; if the UE has shifted a central frequency to measure the carrier in deactivated state, then measurement of the carrier in deactivated state can be terminated directly; if the UE has enabled an idle RF channel to measure the carrier in deactivated state, then the UE disables the idle RF channel and then terminate the measurement of the carrier in deactivated state.

With the embodiment of FIG. 4, the UE also can send a configuration mode that does not take effect immediately and RF capability information in carrier bands to the BS via a RRC connection reconfiguration completion message, so that the BS can be aware of timings at which the UE initiates and closes a gap based on the RF capability information and the configuration mode that does not take effect immediately of the UE, so that data and/or signaling transmission to the UE can be avoided when a gap is initiated by the UE, as a result, UE data and/or signaling loss can prevented.

In the embodiment of the invention, the UE receives a configuration mode that does not take effect immediately; when a deactivation control signaling for a carrier is received by the UE or when a carrier timer of the UE expires, the UE initiates a gap or shifts a central frequency or enable an idle RF channel to measure a carrier in deactivated state; if an activation control signaling for a carrier in deactivated state that is being measured is received by the UE, the UE terminates measurement of the carrier in deactivated state, so that through deactivated carrier measurement control, the UE can reduce terminal battery power consumption and improve system performance.

FIG. 5 is a schematic diagram of a flow of a method for measuring a carrier in deactivated state according to another embodiment of the invention, where UE selects a RF channel corresponding to one or more activated carriers to initiate a gap, or shifts RF central frequency, or selects an idle RF channel corresponding to one or more deactivated carriers to measure the carriers in deactivated state, comprising the following steps:

Step 501. The UE sends RF capability information of the UE to a base station.

When the base station configures a new carrier for the UE, the UE sends RF capability within a band of the new carrier to the BS only when there are at least two RF channels in the band.

In one embodiment, the UE sends RF capability information in the same band to the base station.

For example, the capability information can be UE-EUTRA-Capability, where the RF capability information of the UE can comprise number of RF channels that can be supported in the band and receiving bandwidth supported by each RF channel, where the receiving bandwidth can be a maximum receiving bandwidth.

The RF capability in the band may further comprise receiving bandwidth supported in the band, the receiving bandwidth being a bandwidth in which the UE can receive data and/or measure bandwidth simultaneously when all RF channels are enabled. The receiving bandwidth and/or measurement bandwidth may be a maximum bandwidth.

If the RF capability in the same band supports the same receiving bandwidth, then the RF capability information in the same band can only comprise the number of RF channels supported in the band.

The RF capability in the band may further comprise receiving bandwidth supported in the band, that is, the receiving bandwidth is a bandwidth in which the UE can receive data and/or measure bandwidth simultaneously when all RF channels are enabled. The receiving bandwidth and/or measurement bandwidth may be a maximum bandwidth.

Step 502. The UE receives an RRC connection configuration message sent from the base station, where a configuration message that does not take effect immediately is carried on the configuration message.

Step 503. The UE stores the configuration mode that does not take effect immediately.

Step 504. Sends an RRC connection reconfiguration completion message to the base station.

Step 505. The UE receives a deactivation control signaling for a carrier sent from the base station, and switches the carrier from activated state to deactivated state.

Alternatively, when a carrier timer of the UE expires, the carrier is switched from activated state to deactivated state.

The control signaling can be Medium Access Control (MAC) signaling or a physical layer control signaling.

Step 506. The UE selects an RF channel corresponding to one or more activated carriers to initiate a gap thereon, or shifts an RF central frequency, or selects an idle RF channel corresponding to one or more activated carriers to measure one or more deactivated carriers as selected objects.

The UE receives a deactivation control signaling for carriers, switches those carriers from activated state to deactivated state, and selects an RF channel corresponding to the one or more activated carriers to measure the carriers in deactivated state by measuring according to the RF capability of the UE, wherein during one measurement period, a non-repeated measurement is performed on at least one carrier in deactivated state on a RF channel corresponding to at least one carrier in activated state.

The measurement of deactivated carriers by the UE can be pre-configured by the BS and the UE. For example, as shown in FIG. 5a1, if carriers CC1, CC2, CC3, CC4 are carriers in an activated state, when a deactivation control signaling for CC3 and CC4 is received by the UE, if the UE is going to measure CC3 and CC4, as shown in FIG. 5a2, the UE can initiate a gap on RF1 corresponding to CC1 to measure CC3 and CC4; as shown in FIG. 5a3, the UE also can initiate a gap on RF2 corresponding to CC2 to measure CC3 and CC4; as shown in FIG. 5a4, the UE also can initiate a gap on RF1 to measure CC3 and initiate a gap on RF2 to measure CC4.

Figure 8:
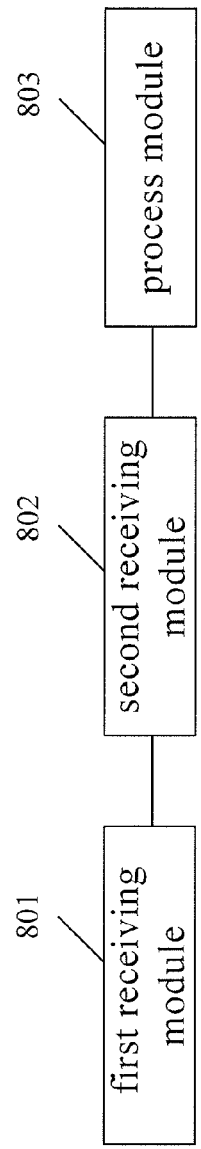

As shown in FIG. 5a5, if carriers CC1, CC2, CC3 are carriers in activated state, when a deactivation control signaling for CC1 is received by the UE, if the UE is going to measure CC1 in deactivated state, it can be measured according to configuration information of the BS and the UE. For example, as shown in FIG. 5a6, a gap can be initiated on RF2 to measure CC1; as shown in FIG. 5a7; the central frequency of RF1 can be shifted from A to B to measure CC1; as shown in FIG. 5a8, a gap can also be initiated on RF1 to measure CC1.

Step 507. The UE receives an activation control signaling sent from the BS for a carrier in deactivated state that is being measured.

Step 508. The UE terminates the measurement of the carrier in deactivated state.

At step 506, if the UE has initiated a gap to measure the carrier in deactivated state, the gap has to be closed at first, and then the measurement of the carrier in deactivated state can be terminated; if the UE has shifted a central frequency to measure the carrier in deactivated state, the measurement of the carrier in deactivated state can be terminated directly; if the UE has enabled an idle RF channel to measure the carrier in deactivated state, the UE disables the idle RF channel and then terminate the measurement of the carrier in deactivated state.

In the embodiment of the invention, the UE receives a configuration mode that does not take effect immediately; when a deactivation control signaling for a carrier is received by the UE or when a carrier timer of the UE expires, the UE selects an RF channel corresponding to one or more carriers in activated state to initiate a gap, or shifts an RF central frequency, or selects an idle RF channel corresponding to one or more carriers in activated state, to measure one or more deactivated carriers as selected measuring objects. When an activation control signaling for a carrier in deactivated state that is being measured is received by the UE, the UE terminates the measurement of the carrier in deactivated state, so that through controllable deactivated carrier measurement, the UE can reduce terminal battery power consumption and improve system performance.

FIG. 6 is a schematic diagram of a flow of a method for measuring a carrier in deactivated state according to another embodiment of the invention, in which according to configuration information of carriers of a UE, the UE selects measurement configuration information corresponding to the configuration information from a set of measurement configuration information to measure carriers in deactivated state, comprising the following steps.

Step 601. The UE sends RF capability information of the UE to a base station.

Wherein, at step 601, the UE sends to BS RF capability in a band of a configured carrier only if there are at least two RF channels in the band.

In one embodiment, the UE sends its RF capability in the same band to the base station.

For example, the capability information can be UE-EUTRA-Capability, where the RF capability information of the UE may comprise a number of RF channels that can be supported in the band and receiving bandwidth supported by each RF, where the receiving bandwidth can be a maximum receiving bandwidth.

The RF capability in the band may further comprise receiving bandwidth supported in the band, the receiving bandwidth is a bandwidth in which the UE can receive data and/or measure bandwidth simultaneously when all RF channels are enabled; the receiving bandwidth and/or measurement bandwidth can be a maximum bandwidth.

If the RF capability in the same band supports the same receiving bandwidth, the RF capability information in the same band can only comprise the number of RF channels supported in the band.

The RF capability in the band may further comprise receiving bandwidth supported in the band, the receiving bandwidth is a bandwidth in which the UE can receive data and/or measure bandwidth simultaneously when all RF channels are enabled; the receiving bandwidth and/or measurement bandwidth can be a maximum bandwidth.

For different frequency bands, the UE uses several RF channels. However, for multiple frequencies in the same band, for example, the 3.5G frequency band, a total 5 carriers are supported in 100M; if the UE has a main carrier and auxiliary carriers in one band, the UE may have multiple RF channels, and a deactivated auxiliary carrier can be measured without a gap.

Step 602. The BS sends to UE a configuration message with a configuration mode that does not take effect immediately, where the configuration message may carry a set of measurement configuration information.

As shown in Table 1, measurement configuration information set 1 comprises:

TABLE 1

| No. | Deactivated CC | Activated CC | Measurement Configuration Information |
|---|---|---|---|
| 1 | CC1 | CC2, CC3, CC4 | Initiate a gap on RF3 |
| 2 | CC2 | CC1, CC3, CC4 | Initiate a gap on RF2 |
| 3 | CC3 | CC1, CC2, CC4 | Initiate a gap on RF2 |
| 4 | CC4 | CC1, CC2, CC3 | Initiate a gap on RF1 |
| 5 | CC1, CC2 | CC3, CC4 | Initiate a gap on RF3 to measure CC1, initiate a gap on RF2 to measure CC2 |
| 6 | CC1, CC3 | CC2, CC4 | Initiate a gap on RF3 to measure CC1, initiate a gap on RF2 to measure CC3 |
| 7 | CC1, CC4 | CC2, CC3 | enable RF1 to measure CC1, CC4 |
| 8 | CC2, CC3 | CC1, CC4 | enable RF3 to measure CC2, CC3 |
| 9 | CC2, CC4 | CC1, CC3 | Initiate a gap on RF1 to measure CC4, initiate a gap on RF2 to measure CC2 |
| 10 | CC3, CC4 | CC2, CC3 | enable RF1 to measure CC1, and initiate a gap to measure CC4 |
| 11 | CC1, CC2, CC3 | CC4 | enable RF2 to measure CC2, CC3, and initiate a gap on RF3 to measure CC1 |
| 12 | CC2, CC3, CC4 | CC1 | enable RF2 to measure CC2, CC3, and initiate a gap on RF1 to measure CC4 |
| 13 | CC1, CC3, CC4 | CC2 | enable RF1 to measure CC1, and initiate a gap to measure CC4; initiate a gap on RF2 to measure CC3 |
| 14 | CC1, CC2, CC4 | CC3 | enable RF3 to measure CC4, and initiate a gap to measure CC1; initiate a gap on RF2 to measure CC2 |

As shown in FIG. 6a, carriers CC1 and CC4 correspond to RF1 and RF3, respectively, CC2 and CC3 share RF2, for example, when CC2 is a carrier in deactivated state, and CC1, CC3, CC4 are carriers in activated state, Table 2 is measurement configuration information set 2, the UE can select No. 2 configuration information from the measurement configuration information set 2 according to configuration information of current configured activated or deactivated carriers, that is, to measure CC2 through shifting central frequency of RF2.

For example, the measurement configuration information set 2 comprises:

TABLE 2

| No. | Deactivated CC | Activated CC | Measurement configuration information |
|---|---|---|---|
| 1 | CC1 | CC2, CC3, CC4 | Initiate a gap on RF3 |
| 2 | CC2 | CC1, CC3, CC4 | Shift the central frequency of RF2 |
| 3 | CC3 | CC1, CC2, CC4 | Shift the central frequency of RF2 |
| 4 | CC4 | CC1, CC2, CC3 | Initiate a gap on RF1 |

TABLE 2-continued

| No. | Deactivated CC | Activated CC | Measurement configuration information |
|---|---|---|---|
| 5 | CC1, CC2 | CC3, CC4 | Initiate a gap on RF3 to measure CC1; Shift the central frequency of RF2 to measure CC2 |
| 6 | CC1, CC3 | CC2, CC4 | Initiate a gap on RF3 to measure CC1; Shift central frequency of RF2 to measure CC3 |
| 7 | CC1, CC4 | CC2, CC3 | Enable RF1 to measure CC1, CC4 |
| 8 | CC2, CC3 | CC1, CC4 | Enable RF3 to measure CC2, CC3 |
| 9 | CC2, CC4 | CC1, CC3 | Initiate a gap on RF1 to measure CC4; Shift central frequency of RF2 to measure CC2 |
| 10 | CC3, CC4 | CC2, CC3 | Enable RF1 to measure CC1, and initiate a gap to measure CC4 |
| 11 | CC1, CC2, CC3 | CC4 | Enable RF2 to measure CC2, CC3, and initiate a gap on RF3 to measure CC1 |
| 12 | CC2, CC3, CC4 | CC1 | Enable RF2 to measure CC2, CC3, and initiate a gap on RF1 to measure CC4 |
| 13 | CC1, CC3, CC4 | CC2 | Enable RF1 to measure CC1, and initiate a gap to measure CC4; Shift central frequency of RF2 to measure CC3 |
| 14 | CC1, CC2, CC4 | CC3 | Enable RF3 to measure CC4, and initiate a gap to measure CC1; Shift the central frequency of RF2 to measure CC2 |

Step 603. The UE stores the configuration message carrying configuration mode that does not take effect immediately.

Step 604. The UE receives a deactivation control signaling for a carrier sent from the base station.

Step 605. The UE receives a deactivation control signaling for at least one carrier; switches the at least one carrier from activated state to deactivated state; and selects measurement configuration information corresponding to the UE configuration information from the measurement configuration information set to measure the carrier in deactivated state.

The control signaling can be Medium Access Control (MAC) signaling or a physical layer control signaling.

Step 606. The UE receives an activation control signaling for a carrier in deactivated state that is being measured from the BS.

Step 607. The UE terminates measurement of the carrier in deactivated state.

At step 605, if the UE has initiated a gap to measure the carrier in deactivated state, the gap has to be closed at first, and then the measurement of the carrier in deactivated state can be terminated; if the UE has shifted a central frequency to measure the carrier in deactivated state, the measurement of the carrier in deactivated state can be terminated directly; if the UE has initiated an idle RF channel to measure the carrier in deactivated state, the UE needs to close the idle RF channel and then terminate the measurement of the carrier in deactivated state.

FIG. 7 is a schematic diagram of a flow of a method for measuring a carrier in deactivated state according to another embodiment of the invention.

Step 701. A base station sends a configuration mode that does not take effect immediately.

Step 702. The BS sends a deactivation control signaling to UE to cause the UE to switch a carrier from activated state to deactivated state when receiving the carrier deactivation control signaling, and measure the carrier in deactivated state; or Alternatively, at step 703, the BS sends an activation control signaling for a carrier in deactivated state that is being measured to the UE, to cause the UE to terminate the measurement of the carrier in deactivated state.

In the embodiment of the invention, a BS sends a configuration mode that does not take effect immediately to a UE, to cause the UE to receive a deactivation control signaling for a carrier or a timeout notification of a carrier timer of the UE, switch the carrier from activated state to deactivated state, and measure the carrier in deactivated state; or to cause the UE to terminate measurement of the carrier in deactivated state if an activation control signaling for a carrier in deactivated state that is being measured is received by the UE. Through controllable deactivated carrier measurement, the UE can reduce terminal battery power consumption and improve system performance.

FIG. 8 is a schematic structure diagram of an apparatus for measuring a carrier in deactivated state according to an embodiment of the invention.

A first receiving module 801 is configured for receiving a configuration mode that does not take effect immediately.

A second receiving module 802 is configured for receiving a deactivation control signaling for a carrier or a timeout notification of a carrier timer, or receiving an activation control signaling for a carrier in deactivated state that is being measured.

A process module 803 is configured for when a deactivation control signaling or a timeout notification is received by the second receiving module, switching the carrier from activated state to deactivated state, and measuring the carrier in deactivated state; or when an activation control signaling for a carrier in deactivated state is received by the second receiving module, terminating measurement of the carrier in deactivated state.

Figure 8A:
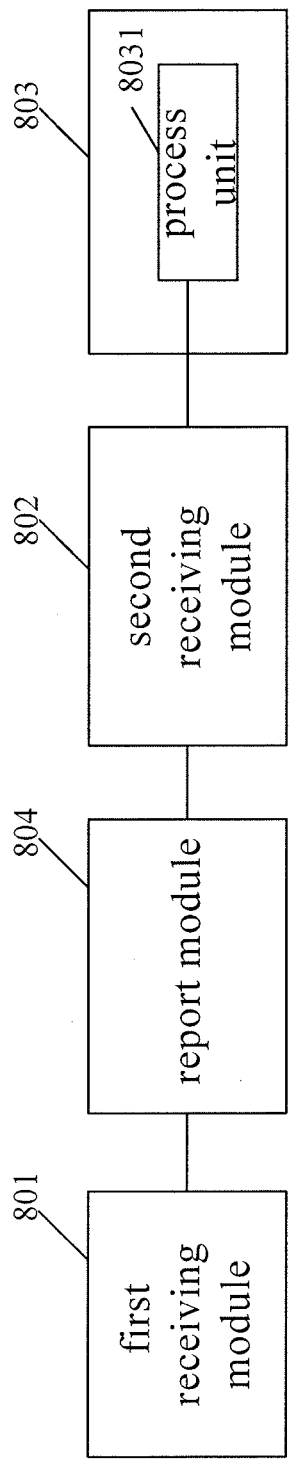
FIG. 8a is another schematic structure diagram of an apparatus for measuring a carrier in deactivated state of the invention.

When a deactivation control signaling or a timeout notification of a carrier of the UE is received by the second receiving module, the carrier is switched from activated state to deactivated state, as shown in FIG. 8a. The process module 803 is particularly used to:

initiate a gap to measure the carrier in deactivated state;

if each of configured carriers corresponds to an RF channel, according to RF capability, initiate a gap on an enabled RF to measure the carrier in deactivated state;

if each of configured carriers corresponds to an RF channel, according to RF capability of the UE, enable an RF channel corresponding to the carrier in deactivated state to perform measurement;

if at least two configured carriers share an RF channel, according to RF capability of the UE, shift central frequency of the RF channel to measure the carrier in deactivated state;

if at least two configured carriers corresponds ton a RF channel, according to RF capability of the UE, initiate a gap on an enable RF channel to measure the carrier in deactivated state; and according to the RF capability, select an RF channel corresponding to one or more carriers in activated state to measure carriers in deactivated state by measuring manner.

Furthermore, the process module 803 is used to, according to the RF capability, select an RF channel corresponding to one or more carriers in activated state to measure the carriers in deactivated state by measuring manner. The process module 803 further comprises a process unit 8031 for performing non-repeated measurement on at least one carrier in deactivated state on an RF channel corresponding to at least one carrier in activated state during one measurement period.

Furthermore, the apparatus in FIG. 8a further comprises a reporting module 804.

The reporting module 804 is configured for reporting RF capability information of the UE, where the RF capability information comprises a number of RF channels that are supported in a band of the UE and receiving bandwidth supported by each RF channel; or if RF capability in the same band supports the same receiving bandwidth, the RF capability information of the same band only comprises the number of RF channels supported in the band; or the RF capability information of the band comprises receiving bandwidth supported in the band, that is, receiving bandwidths in which the UE receives data and/or measures bandwidth simultaneously when all RFs are enabled.

In one embodiment, the first receiving module is particularly used to receive a configuration message carrying a configuration mode that does not take effect immediately and a measurement information set, when the second receiving module receives a deactivation control signaling for a carrier or a timeout notification of a carrier timer of the UE, the carrier is switched from activated state to deactivated state; the process module is particularly used to receive a deactivation control signaling for at least one carrier, switch the at least one carrier from activated state to deactivated state; the UE selects measurement configuration information corresponding to the carrier configuration information of the UE from the measurement configuration set according to the carrier configuration information of the UE, to measure the carrier in deactivated state.

In one embodiment of the invention, a user terminal UE receives a configuration mode that does not take effect immediately, if a deactivation control signaling for a carrier or a timeout notification of a carrier timer of the UE is received by the UE, the carrier is switched from activated state to deactivated state, and the UE measures the carrier in deactivated state; or if an activation control signaling for a carrier in deactivated state that is being measured is received by the UE, the UE terminates measurement of the carrier in deactivated state. Through controllable deactivated carrier measurement, the UE can reduce terminal battery power consumption and improve system performance.

Figure 9:
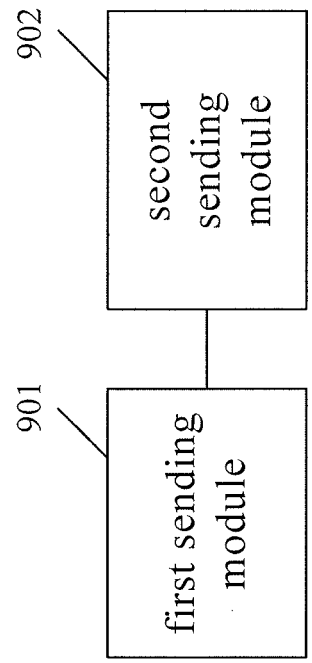
FIG. 9 is a schematic structure diagram of a base station of the invention.

FIG. 9 is a schematic structure diagram of a base station of the invention.

In FIG. 9, a first sending module 901 is configured for sending a configuration mode that does not take effect immediately.

A second sending module 902 is configured for sending a deactivation control signaling to a UE to cause the UE to switch a carrier from activated state to deactivated state when receiving the deactivation control signaling for the carrier, and measuring the carrier in deactivated state; or for sending the UE an activation control signaling for a carrier in deactivated state that is being measured, to cause the UE to terminate measurement of the carrier in deactivated state.

In one embodiment, the first sending module is particularly used to send configuration information carrying a configuration mode that does not take effect immediately and a measurement information set.

In one embodiment of the invention, the BS sends a configuration mode that does not take effect immediately to a user terminal UE; the BS sends a deactivation control signaling for a carrier to the UE, to cause the UE to switch the carrier from activated state to deactivated state when receiving the deactivation control signaling for the carrier, and measure the carrier in deactivated state; or the BS sends an activation control signaling for a carrier in deactivated state that is being measured to the UE, to cause the UE to switch the carrier from activated state to deactivated state when receiving the deactivation control signaling for the carrier, and measure the carrier in deactivated state. Through controlling deactivated carrier measurement, the UE can reduce terminal battery power consumption and improve system performance.

The apparatus of the embodiment of the invention is used to perform steps of methods of above embodiments.

Embodiments of the invention have been described with three or four carriers as an example. However, embodiments of the invention are not limited to the carrier number specified in above embodiments.

Through the description of various embodiments above, those skilled in the art can clearly understand that the invention can be implemented in a manner of software and an essential general-purpose hardware platform. Of course, it can be implemented by hardware, but the former is preferred in most cases. Based upon such understanding, the technical solutions of the invention or a part thereof contributing to the prior art can essentially be embodied in the form of a software product, which can be stored in a storage medium, which includes several instructions to cause a computer device (which may be a personal computer, a server, a network device, etc.) to perform the methods according to the respective embodiments of the invention.

Although the invention has been illustrated and described with reference to some preferred embodiments of the invention, those skilled in the art may understand that various modifications in the form and details can be made without departing from the spirit and scope of the invention.

What is claimed is:

1. A method for measuring a carrier in a deactivated state, comprising:
   receiving by a user terminal (UE) a request to enter a configuration mode that does not take effect immediately; and
   when the UE is in the configuration mode that does not take effect immediately, if a deactivation control signal for a carrier is received by the UE or if a carrier timer of the UE expires, then switching the carrier from an activated state to a deactivated state, and measuring the carrier in the deactivated state; or
   when the UE is in the configuration mode that does not take effect immediately, if an activation control signal for a carrier in a deactivated state that is being measured is received, then terminating measurement of the carrier in the deactivated state by the UE.

2. The method according to claim 1, wherein the receiving the request to enter the configuration mode that does not take effect immediately comprises:

receiving a Radio Resource Control (RRC) connection reconfiguration message by the UE, wherein the request to enter the configuration mode that does not take effect immediately is carried on the RRC connection reconfiguration message; or receiving by the UE a newly configured carrier message, wherein the request to enter the configuration mode that does not take effect immediately is carried on the newly configured carrier message.

3. The method according to claim 1, wherein the measuring the carrier in the deactivated state comprises:
initiating a gap by the UE to measure the carrier in the deactivated state.

4. The method according to claim 1, wherein the measuring the carrier in the deactivated state comprises:
if each carrier corresponds to an RF (radio frequency) channel, initiating a gap on an enabled RF channel by the UE to measure the carrier in the deactivated state in the gap; or
if each carrier corresponds to an RF channel, enabling an RF channel corresponding to the carrier in the deactivated state by the UE to measure the carrier in the deactivated state on the corresponding RF channel; or
if at least two carriers share an RF channel, shifting a central frequency of the RF channel by the UE to a central frequency of receiving bandwidth of the at least two carriers that is covered by the shared RF channel, and measuring the carrier in the deactivated state on the RF channel; or
if at least two carriers share an RF channel, initiating a gap by the UE on the shared RF channel that has been enabled to measure the carrier in the deactivated state in the gap.

5. The method according to claim 1, wherein the measuring the carrier in deactivated state by the UE comprises:
according to RF (radio frequency) capability of the UE, selecting an RF channel corresponding to one or more carriers in an activated state by the UE, enabling the RF channel or initiating a gap on the RF channel to measure the carrier in the deactivated state.

6. The method according to claim 1, further comprising:
reporting, by the UE, RF (radio frequency) capability information of the UE,
wherein the RF capability information of the UE comprises:
a number of RF channels supported by the UE and receiving bandwidth supported by each RF channel; or
if the receiving bandwidth of the RF channels of the UE are same, the RF capability information of the UE only comprises the number of RF channels supported by the UE; or,
the RF capability information of the UE comprises receiving bandwidth supported by the UE, the receiving bandwidth including bandwidth supported by the UE for data receiving and/or measurement when all RF channels supported by the UE are enabled.

7. The method according to claim 6, wherein the receiving by the UE the request to enter the configuration mode that does not take effect immediately comprises:
receiving a configuration message carrying the configuration mode that does not take effect immediately and receiving by the UE a measurement information set.

8. The method according to claim 7, wherein the switching the carrier from the activated state to the deactivated state comprises switching at least one carrier from n activated state to a deactivated state;

wherein the measuring the carrier in the deactivated state by the UE comprises:
according to the configuration information of the UE, selecting measurement configuration information corresponding to the configuration information of the UE from the measurement configuration information set to measure the carrier in deactivated state.

9. A method for measuring a carrier in a deactivated state, comprising:
sending a request to enter a configuration mode that does not take effect immediately to a user terminal (UE) by a base station, to place the UE in the configuration mode that does not take effect immediately;
sending an activation control signal for a carrier from the base station to the UE, to cause the UE to switch a carrier from an activated state to a deactivated state when receiving the activation control signal for the carrier, and measure the carrier in deactivated state; or
sending an activation control signal for a carrier in a deactivated state that is being measured from the base station to the UE, to cause the UE to terminate measurement of the carrier in the deactivated state.

10. The method according to claim 9, wherein the sending the request to enter the configuration mode that does not take effect immediately by the base station comprises:
sending configuration information carrying the configuration mode that does not take effect immediately and a measurement information set by the base station; or
sending an Radio Resource Control (RRC) connection reconfiguration message by the base station, wherein the request to enter the configuration mode that does not take effect immediately is carried on the RRC connection reconfiguration message; or
sending a newly configured carrier message by the base station, wherein the request to enter the configuration mode that does not take effect immediately is carried on the newly configured carrier message.

11. An apparatus for measuring a carrier in a deactivated state, comprising:
a first receiver, configured to receive a request to enter a configuration mode that does not take effect immediately;
a second receiver, configured to, when in the configuration mode that does not take effect immediately, receive a deactivation control signal for a carrier or a timeout notification of a carrier timer, or when in the configuration mode that does not take effect immediately, receive an activation control signal for a carrier in deactivated state that is being measured; and
a processor, configured to, when a deactivation control signal or a timeout notification is received by the second receiver, switch the carrier from an activated state to a deactivated state, and measure the carrier in the deactivated state; and/or when an activation control signal for a carrier in a deactivated state is received by the second receiver, terminate measurement of the carrier in the deactivated state.

12. The apparatus according to claim 11, wherein the processor is further configured to:
initiate a gap to measure the carrier in the deactivated state; or
if each carrier corresponds to an RF (radio frequency) channel, initiate a gap on an enabled RF channel by the UE to measure the carrier in the deactivated state within the gap; or
if each carrier corresponds to an RF channel, enable an RF channel corresponding to the carrier in the deactivated state by the UE to measure the carrier in the deactivated state on the corresponding RF channel; or if at least two carriers share an RF channel, shift a central frequency of the RF channel by the UE to a central frequency of the receiving bandwidth of the at least two carriers that is covered by the shared RF channel, and measure the carrier in the deactivated state on the RF channel; or if at least two carriers share an RF channel, initiate a gap on the shared RF that has been enabled by the UE to measure the carrier in deactivated state within the gap.

13. The apparatus according to claim 11, wherein the processor is further configured to:

according to RF (radio frequency) capability of the UE, select an RF channel corresponding to one or more carriers in an activated state, enable the RF channel, or initiate a gap on the RF channel to measure the carrier in the deactivated state.

14. The apparatus according to claim 11, wherein the apparatus further comprises:

a reporting module, configured to report RF (radio frequency) capability information, the RF capability information comprises a number of RF channels supported by the UE and receiving bandwidth supported by each RF channel; or if multiple RF channels of the UE are capable of supporting the same receiving bandwidth, the RF capability information of the UE only comprises the number of RF channels supported by the UE; or the RF capability information of the UE comprises receiving bandwidth supported by the UE, which includes bandwidth supported by the UE for data receiving and/or measurement when all RF channels supported by the UE are enabled.

15. The apparatus according to claim 14, wherein the first receiver is further configured to receive a configuration message carrying the configuration mode that does not take effect immediately and a measurement information set;

the processor is further configured to, when a deactivation control signal for a carrier or a timeout notification of a carrier timer is received by the second receiver, switch the carrier from the activated state to the deactivated state, receive a deactivation control signal for at least one carrier, switch the at least one carrier from the activated state to the deactivated state, select measurement configuration information corresponding to the configuration information from the measurement information set to measure the carrier in the deactivated state according to the configuration information.

16. A base station, comprising:

a first transmitter, configured to send a request to enter a configuration mode that does not take effect immediately to a UE to cause the UE to enter the configuration mode that does not take effect immediately;

a second transmitter, configured to send a deactivation control signal for a carrier to the UE to cause the UE to switch a carrier from an activated state to a deactivated state when receiving the deactivation control signal for the carrier, and measure the carrier in the deactivated state; or for sending an activation control signal for a carrier in the deactivated state that is being measured, to cause the UE to terminate measurement of the carrier in the deactivated state.

17. The base station according to claim 16, wherein sending the request to enter the configuration mode that does not take effect immediately comprises:

sending configuration information carrying the configuration mode that does not take effect immediately and a measurement information set; or sending an Radio Resource Control (RRC) connection reconfiguration message, wherein the configuration mode that does not take effect immediately is carried on the RRC connection reconfiguration message; or sending a newly configured carrier message, wherein the configuration mode that does not take effect immediately is carried on the newly configured carrier message.

18. A computer-readable storage medium storing instructions that, when executed by a processing unit, cause a computer system to measure a carrier in a deactivated state, by performing the steps of:

receiving by a user terminal (UE) a request to enter a configuration mode that does not take effect immediately; and when the UE is in the configuration mode that does not take effect immediately, if a deactivation control signal for a carrier is received by the UE or if a carrier timer of the UE expires, then switching the carrier from an activated state to a deactivated state, and measuring the carrier in the deactivated state; or when the UE is in the configuration mode that does not take effect immediately, if an activation control signal for a carrier in a deactivated state that is being measured is received, then terminating measurement of the carrier in the deactivated state by the UE.

\* \* \* \* \*

UNITED STATES PATENT AND TRADEMARK OFFICE
CERTIFICATE OF CORRECTION

Page 1 of 1

PATENT NO.         : 9,031,595 B2
APPLICATION NO.    : 13/664174
DATED              : May 12, 2015
INVENTOR(S)        : Chai et al.

It is certified that error appears in the above-identified patent and that said Letters Patent is hereby corrected as shown below:

In the claims

Column 15, line 66, "n activated state" should read -- an activated state --.

Signed and Sealed this
Fifteenth Day of December, 2015

Michelle K. Lee
*Director of the United States Patent and Trademark Office*